(12) United States Patent
Woo et al.

(10) Patent No.: US 11,685,441 B2
(45) Date of Patent: Jun. 27, 2023

(54) CHASSIS FRAME FOR ELECTRIC VEHICLE

(71) Applicant: HYUNDAI MOBIS CO., LTD., Seoul (KR)

(72) Inventors: Hyun Jin Woo, Yongin-si (KR); Hyoun Young Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/586,064

(22) Filed: Jan. 27, 2022

(65) Prior Publication Data

US 2022/0242491 A1 Aug. 4, 2022

(30) Foreign Application Priority Data

Feb. 3, 2021 (KR) .................. 10-2021-0015307

(51) Int. Cl.
  *B62D 21/02* (2006.01)
  *B62D 27/06* (2006.01)
  *B62D 21/03* (2006.01)
  *B62D 21/12* (2006.01)
  *B60K 1/04* (2019.01)

(52) U.S. Cl.
  CPC ............ *B62D 21/02* (2013.01); *B62D 21/03* (2013.01); *B62D 21/12* (2013.01); *B62D 27/065* (2013.01); *B60K 1/04* (2013.01)

(58) Field of Classification Search
  CPC .. B60K 1/04; B60K 2001/0438; B62D 21/02; B62D 21/12; B62D 27/023; B62D 27/065; B60Y 2200/91; B60Y 2304/07
  USPC .......... 296/204, 25, 205; 280/781, 785, 798, 280/800
  See application file for complete search history.

(56) References Cited

U.S. PATENT DOCUMENTS

| | | | | |
|---|---|---|---|---|
| 6,003,935 A | * | 12/1999 | Kalazny | B62D 21/14 296/204 |
| 6,533,348 B1 | * | 3/2003 | Jaekel | B62D 29/00 296/205 |
| 6,548,792 B1 | * | 4/2003 | Durand | B23K 20/06 228/115 |
| 2013/0206496 A1 | * | 8/2013 | Hashimoto | B62D 21/12 180/291 |
| 2017/0001507 A1 | * | 1/2017 | Ashraf | B62D 21/07 |

* cited by examiner

*Primary Examiner* — Dennis H Pedder
(74) *Attorney, Agent, or Firm* — NSIP Law

(57) ABSTRACT

A chassis frame for an electric vehicle may include: a first frame and a second frame spaced apart from each other in a longitudinal direction of the electric vehicle; a center frame disposed between the first frame and the second frame, and configured to have side members spaced apart from each other in a widthwise direction of the electric vehicle; a first fastener which extends from the first frame, and is fastened to a first side of the side member; and a second fastener which extends from the second frame, and is fastened to a second side of the side member, wherein the first fastener and the second fastener are configured to be in contact with entire peripheries of the side member.

10 Claims, 8 Drawing Sheets

CHASSIS FRAME FOR ELECTRIC VEHICLE

CROSS-REFERENCE TO RELATED APPLICATION

This application claims the benefit under 35 USC § 119(a) of Korean Patent Application No. 10-2021-0015307, filed on Feb. 3, 2021 in the Korean Intellectual Property Office, the entire disclosure of which is incorporated herein by reference for all purposes.

BACKGROUND

1. Field

The following description relates to a chassis frame for an electric vehicle, and more particularly, to a chassis frame for an electric vehicle, which has a structure divided into three parts.

2. Description of the Related Art

In general, an electric vehicle (EV) refers to a electric vehicle that acquires power by driving an AC or DC motor using battery power. Electric vehicles are classified into dedicated battery electric vehicles and hybrid electric vehicles. The dedicated battery electric vehicle drives a motor by using power of a battery, and the battery is recharged when the power thereof is completely consumed. The hybrid electric vehicle charges a battery by generating electric power through an engine, and is driven by an electric motor using this electric power.

A skateboard platform is a kind of lower vehicle body which supports an electric vehicle and has a similar structure to a skateboard. The skateboard platform applies sufficient stiffness to the electric vehicle, and has core parts mounted as a standardized module thereon, the core parts including a motor, battery and the like. Such a skateboard platform may significantly reduce the size and weight of the electric vehicle and the number of parts included therein, compared to the existing chassis frame for a electric vehicle, which makes it possible to secure an interior space. Therefore, research is being actively conducted on the skateboard platform.

However, the typical skateboard platform is manufactured with a structure in which the entire chassis frame is formed as one body. Thus, it is very inconvenient to carry and manage the skateboard platform, and the efficiency of an assembly process is degraded. Furthermore, since the conventional skateboard platform has a structural limit depending on the draft direction of a cast product, non-contact surfaces are formed on parts of front, rear and center connections. In the case of an inner fastening point, it is difficult for a fastening tool to enter the inner fastening point, due to sub parts of the frame and the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a chassis frame for an electric vehicle includes a first frame and a second frame spaced apart from each other in a longitudinal direction of the electric vehicle; a center frame disposed between the first frame and the second frame, and configured to have side members spaced apart from each other in a widthwise direction of the electric vehicle; a first fastener, which extends from the first frame, and is fastened to a first side of the side member; and a second fastener, which extends from the second frame, and is fastened to a second side of the side member, wherein the first fastener and the second fastener are configured to be in contact with entire peripheries of the side member.

A contact surface of the first fastener and a contact surface of the second fastener with respect to the side member may be configured to be accessible from an exterior of the electric vehicle.

The side member may include a first body which extends in the longitudinal direction of the electric vehicle, and is configured to form a first periphery of the side member; a second body which extends in the longitudinal direction of the electric vehicle, and is configured to form a second periphery of the side member; a first extension part which protrudes in the longitudinal direction of the electric vehicle from a first end of the second body; and a second extension part which protrudes in the longitudinal direction of the electric vehicle from a second end of the second body.

The first body may be disposed outside the electric vehicle in the widthwise direction of the electric vehicle, and the second body may be disposed inside the electric vehicle in the widthwise direction of the electric vehicle.

The first fastener may include a first seating part fastened to the first extension part which is seated thereon; a second seating part disposed on a first side of the first seating part, and fastened to a first side of the first body which is seated thereon; and a first entry part which is recessed into the first seating part from the outside of the electric vehicle in the widthwise direction of the electric vehicle.

The first fastener further may include a first movement prevention part disposed on a second side of the first seating part, and configured to prevent the side member from moving in the longitudinal direction of the electric vehicle.

The second fastener may include a third seating part fastened to the second extension part which is seated thereon; a fourth seating part disposed on a first side of the third seating part, and fastened to a second side of the first body which is seated thereon; and a second entry part recessed into the third seating part from the outside of the electric vehicle in the widthwise direction of the electric vehicle.

The second fastener further may include a second movement prevention part disposed on a second side of the third seating part, and configured to prevent the side member from moving in the longitudinal direction of the electric vehicle.

The second entry part may be configured to have a cross-section formed in a shape of a curve, one side of the second entry part is open, and the second entry part comprises a load dispersion part configured to disperse a load applied to the second fastener.

The load dispersion part may be disposed on a cross-sectional periphery of the second entry part, and is configured to be curved at a predetermined curvature.

The first fastener and the second fastener may be configured to be fastened to the side member through a Flow Drill Screw (FDS) process.

Other features and aspects will be apparent from the following detailed description, the drawings, and the claims.

Figure 1:
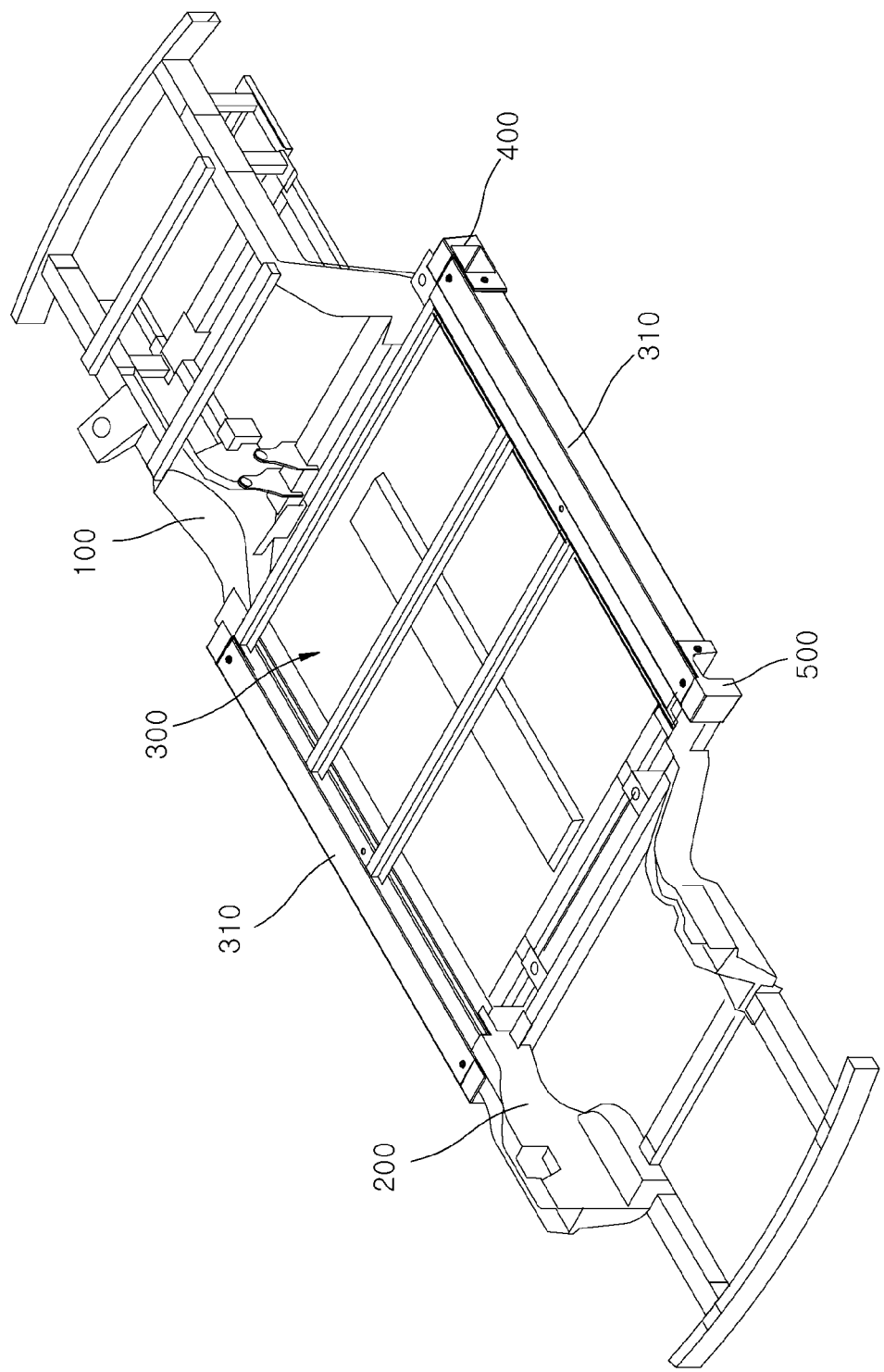
FIG. 1 is a perspective view schematically illustrating the configuration of a chassis frame for an electric vehicle in accordance with an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Various examples are directed to a chassis frame for an electric vehicle, which has a structure divided into a plurality of parts.

Also, various embodiments are directed to a chassis frame for an electric vehicle, which can not only secure reliable fastening strength, but also enable a worker to perform a fastening work outside a electric vehicle.

In accordance with the embodiment of the present disclosure, the chassis frame for an electric vehicle has a structure which can be divided into three parts by the first frame, the second frame and the center frame, which makes it possible to improve the efficiency of the assembly process while the chassis frame is easily carried and managed.

Furthermore, the first and second fasteners are provided so as to come in contact with the entire peripheries of the side member, such that contact points are increased, which makes it possible to secure more reliable fastening strength.

Furthermore, all the fastening surfaces of the chassis frame for an electric vehicle may be accessed from the outside of the electric vehicle through the first and second entry parts. Thus, a worker can efficiently and rapidly perform a fastening work.

Furthermore, since the load dispersion part can disperse a load applied to the second fastening part, sufficient stiffness may be given to the part regardless of the draft.

Figure 2:
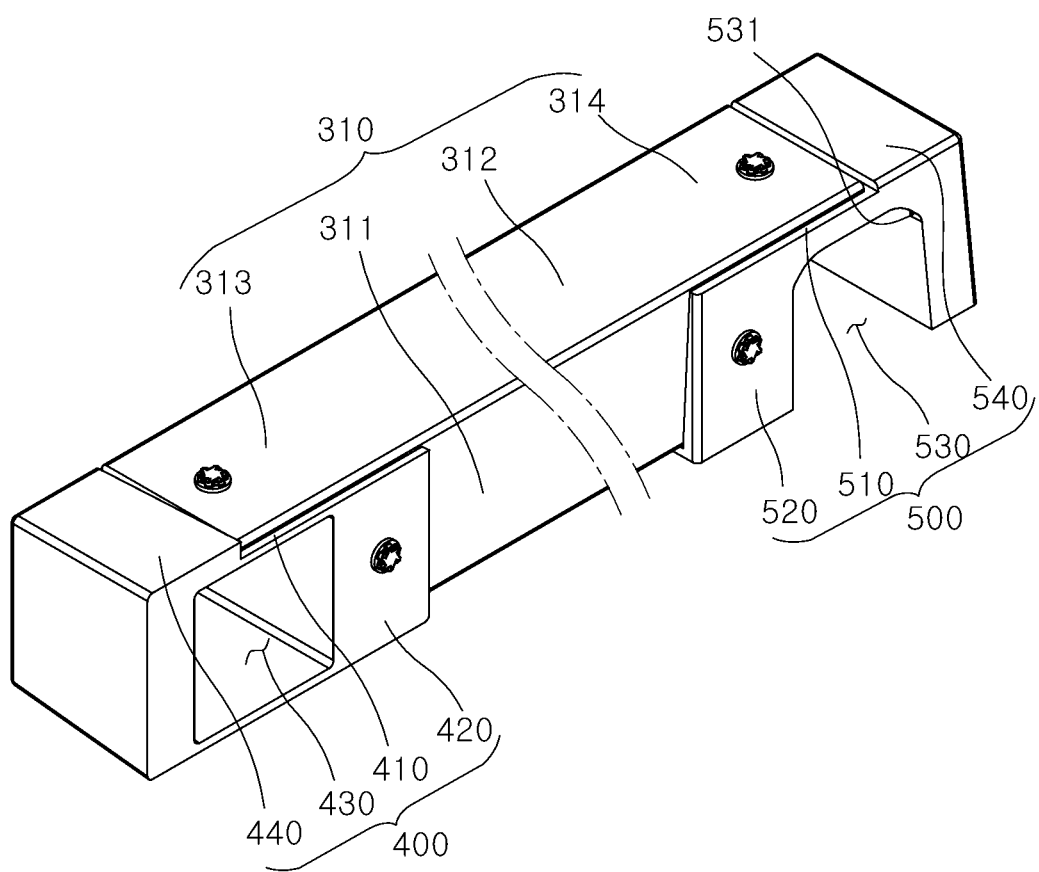
FIG. 2 is a perspective view schematically illustrating the configurations of a center frame, a first fastener and a second fastener in accordance with the embodiment of the present disclosure.
Figure 3:
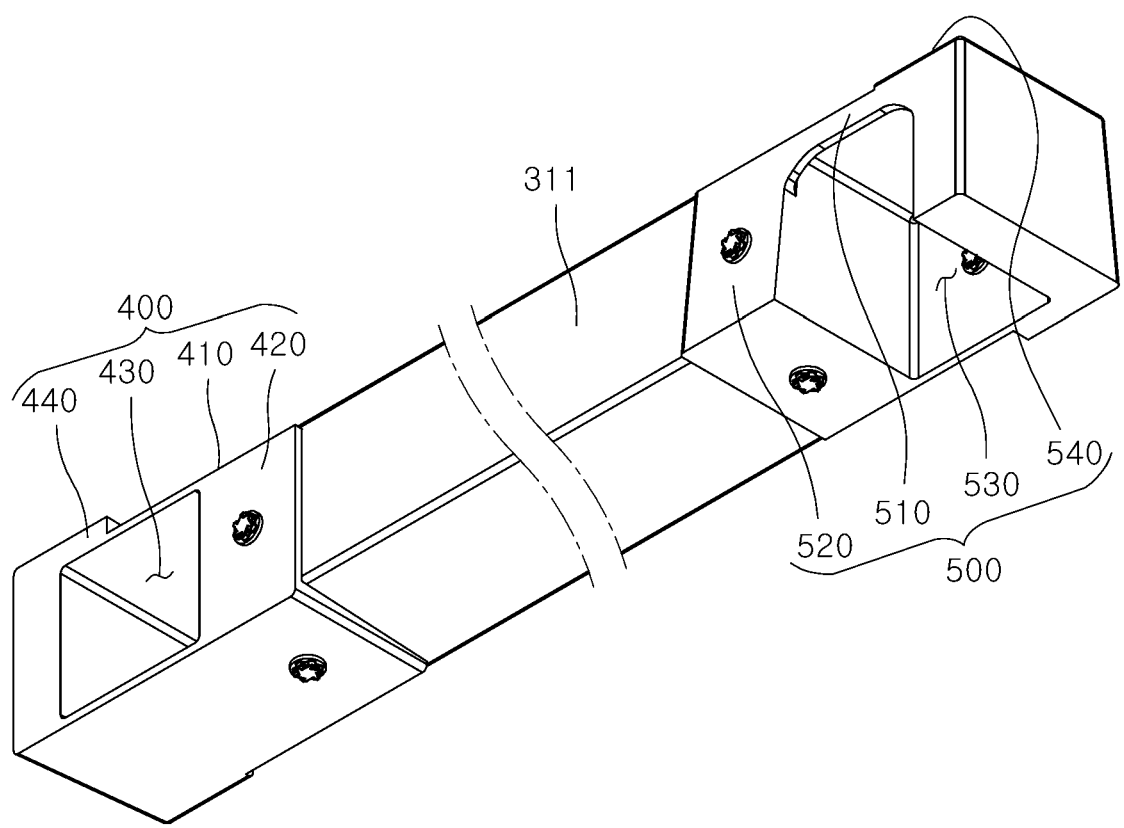
FIG. 3 is a perspective view illustrating the structures of the center frame, the first fastener and the second fastener in accordance with the embodiment of the present disclosure, when seen from a different side from FIG. 2.

FIG. 1 is a perspective view schematically illustrating the structure of a chassis frame for an electric vehicle in accordance with an embodiment of the present disclosure, FIG. 2 is a perspective view schematically illustrating the structure of a center frame, a first fastener and a second fastener in accordance with the embodiment of the present disclosure, and FIG. 3 is a perspective view illustrating the structures of the center frame, the first fastener and the second fastener in accordance with the embodiment of the present disclosure, when seen from a different side from FIG. 2.

Referring to FIG. 1, a chassis frame 1 for an electric vehicle in accordance with an embodiment of the present disclosure includes a first frame 100, a second frame 200, a center frame 300, a first fastener 400 and a second fastener 500.

The first frame 100 forms the front exterior of the chassis frame 1 for an electric vehicle in accordance with the embodiment of the present disclosure. The first frame 100 is fixed to the front bottom surface of a electric vehicle through bolting or the like, and serves to reinforce the stiffness of a vehicle body by supporting a load applied to the front of the vehicle body. The first frame 100 is configured so that various members such as a front axle shaft, a front wheel suspension and a steering unit can be installed thereon. The specific shape of the first frame 100 is not limited to the shape illustrated in FIG. 1, but may be changed in various shapes, as long as the first frame 100 can reinforce the front stiffness of the electric vehicle.

The second frame 200 forms the rear exterior of the chassis frame 1 for an electric vehicle in accordance with the embodiment of the present disclosure. The second frame 200 is spaced apart from the first frame 100 in the longitudinal direction of the electric vehicle. The distance by which the second frame 200 is spaced apart from the first frame 100 may be changed to various values depending on the length of the electric vehicle or the like. The second frame 200 is fixed to the rear bottom surface of the electric vehicle through bolting or the like, and serves to reinforce the stiffness of the vehicle body by supporting a load applied to the rear of the vehicle body. The second frame 200 is configured so that various members such as a rear axle shaft, a rear wheel suspension, a driving motor and a control unit are installed therein. The specific shape of the second frame 200 is not limited to the shape illustrated in FIG. 1, but may be designed in various shapes as long as the second frame 200 can reinforce the rear stiffness of the electric vehicle.

The center frame 300 is disposed between the first frame 100 and the second frame 200, and forms the center exterior of the chassis frame 1 for an electric vehicle in accordance with the embodiment of the present disclosure. The center frame 300 is installed at the center bottom surface of the electric vehicle, and serves to reinforce the stiffness of the vehicle body by supporting a load applied to the central portion of the vehicle body. The center frame 300 is configured to provide the space in which a battery (not illustrated) of an electric vehicle is contained, and serves to support the battery with respect to the vehicle body. The center frame 300 is manufactured separately from the first and second frames 100 and 200, such that the chassis frame 1 for an electric vehicle in accordance with the embodiment of the present disclosure has a structure divided into three parts. The center frame 300 is loaded between the first frame 100 and the second frame 200 from the top of the vehicle body, and then fastened to the first fastener 400 and the second fastener 500 which will be described below. Thus, the center frame 300 is connected to the first and second frames 100 and 200 as one body, and supported by the first and second frames 100 and 200. Thus, it is possible to improve the efficiency of the assembly space of the chassis frame 1 for an electric vehicle in accordance with the embodiment of the present disclosure, while securing the ease of carrying and managing the chassis frame 1.

The center frame 300 in accordance with the embodiment of the present disclosure may include a side member 310. The side member 310 is extended in the longitudinal direction of the electric vehicle, and serves to reinforce the stiffness of the center frame 300 in the longitudinal direction of the vehicle body. The side member 310 may be provided as a pair of side members. In this case, the pair of side members 310 are spaced apart from each other in the widthwise direction of the electric vehicle, and disposed at both side edges of the center frame 300. Both sides of the side member 310 in the longitudinal direction thereof are fastened to the first and second fasteners 400 and 500, respectively, so as to connect the center frame 300 to the first and second frames 100 and 200. The side member 310 may be manufactured by extrusion molding.

Figure 4:
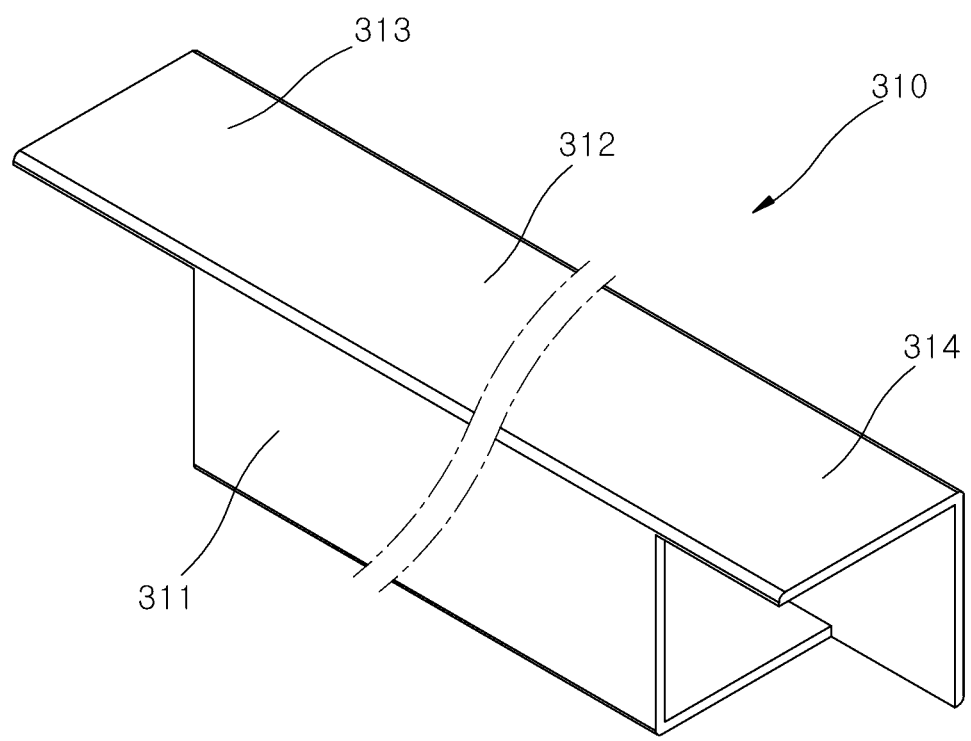
FIG. 4 is a perspective view schematically illustrating the structure of a side member in accordance with the embodiment of the present disclosure.

FIG. 4 is a perspective view schematically illustrating the structure of the side member in accordance with the embodiment of the present disclosure.

Referring to FIG. 4, the side member 310 in accordance with the embodiment of the present disclosure includes a first body 311, a second body 312, a first extension part 313 and a second extension part 314.

Hereafter, the case in which the side member 310 has a rectangular cross-sectional shape will be taken as an example for description. However, the cross-sectional shape of the side member 310 is not limited to a rectangular cross-sectional shape, but may be designed in various shapes such as circular and polygonal cross-sectional shapes.

The first body 311 is extended in the longitudinal direction of the electric vehicle, and forms one periphery of the side member 310. The first body 311 in accordance with the embodiment of the present disclosure may be formed in the shape of a beam having a substantially L-shaped cross-section. The first body 311 is disposed outside (front side in FIG. 4) the electric vehicle in the widthwise direction thereof, and has surfaces serving as the front and bottom surfaces of the side member 310, respectively. The longitudinal direction of the first body 311 is set in parallel to the longitudinal direction of the electric vehicle. The first body 311 has both ends facing the first fastener 400 and the second fastener 500, respectively.

The second body 312 is extended in the longitudinal direction of the electric vehicle, and forms the other periphery of the side member 310. The second body 312 in accordance with the embodiment of the present disclosure may be formed in the shape of a beam having a substantially L-shaped cross-section. The second body 312 is disposed inside (rear side in FIG. 4) the electric vehicle in the widthwise direction thereof, and has surfaces serving as the top and rear surfaces of the side member 310, respectively. The longitudinal direction of the second body 312 is set in parallel to the longitudinal direction of the electric vehicle. The second body 312 has both ends facing the first fastener 400 and the second fastener 500, respectively.

The first extension part 313 protrudes in the longitudinal direction of the electric vehicle from one end of the second body 312. The first extension part 313 in accordance with the embodiment of the present disclosure is extended in the longitudinal direction of the second body 312 from a left end (based on FIG. 4) of the second body 312. The first extension part 313 may have a cross-sectional shape corresponding to the cross-sectional shape of the second body 312. The first extension part 313 may be formed with the second body 312 when the side member 310 is manufactured, and connected to the second body 312 as one body. The length of the first extension part 313 may be changed to various values depending on the shape of the first fastener 400 or the like.

The second extension part 314 protrudes in the longitudinal direction of the electric vehicle from the other end of the second body 312. The second extension part 314 in accordance with the embodiment of the present disclosure is extended in the longitudinal direction of the second body 312 from a right end (based on FIG. 4) of the second body 312. The second extension part 314 may have a cross-sectional shape corresponding to the cross-sectional shape of the second body 312. The second extension part 314 may be formed with the second body 312 when the side member 310 is manufactured, and connected to the second body 312 as one body. The length of the second extension part 314 may be changed to various values depending on the shape of the second fastener 500 or the like.

The first fastener 400 is extended from the first frame 100, and fastened to one side of the side member 310. The first fastener 400 has one side connected to the first frame 100 through bolting or welding. The first fastener 400 has the other side extended toward the front end of the side member 310. The first fastener 400 is provided so as to come into contact with the entire peripheries of the side member 310. For example, when the side member 310 has a rectangular cross-section, the first fastener 400 comes into contact with all four surfaces of the side member 310. Thus, the first fastener 400 may secure fastening points across the entire peripheries of the side member 310, which makes it possible to further reinforce the assembly stiffness.

The contact surfaces of the first fastener 400 with the side member 310 may be all accessible from the outside of the electric vehicle in the widthwise direction thereof. More specifically, among all the contact surfaces of the first fastener 400 with the side member 310, the contact surfaces which are not directly exposed to the outside as well as the contact surfaces which are directly exposed to the outside may be accessed from the outside of the electric vehicle in the widthwise direction thereof by a fastening tool. Therefore, the first fastener 400 may enable a worker to perform a fastening work on all the contact surfaces at a single position, even though the worker does not change a work position depending on a fastening surface, which makes it possible to improve the efficiency and speed of the fastening work.

The first fastener 400 may be provided as a cast product manufactured through cast molding. The first fastener 400 has left and right drafts which are set on the basis of the electric vehicle in consideration of the structure of the vehicle body and the reduction of a consumed material. That is, when the first fastener 400 is formed, a mold is separated in a direction perpendicular to the height direction of the electric vehicle.

The first fastener 400 may be fastened to the side member 310 through an FDS (Flow Drill Screw) process. The FDS process indicates a process of forming screw threads on the inner surfaces of different base materials by rotating a screw on the base materials brought into contact with each other at high speed, in order to fasten the base materials to each other.

Figure 5:
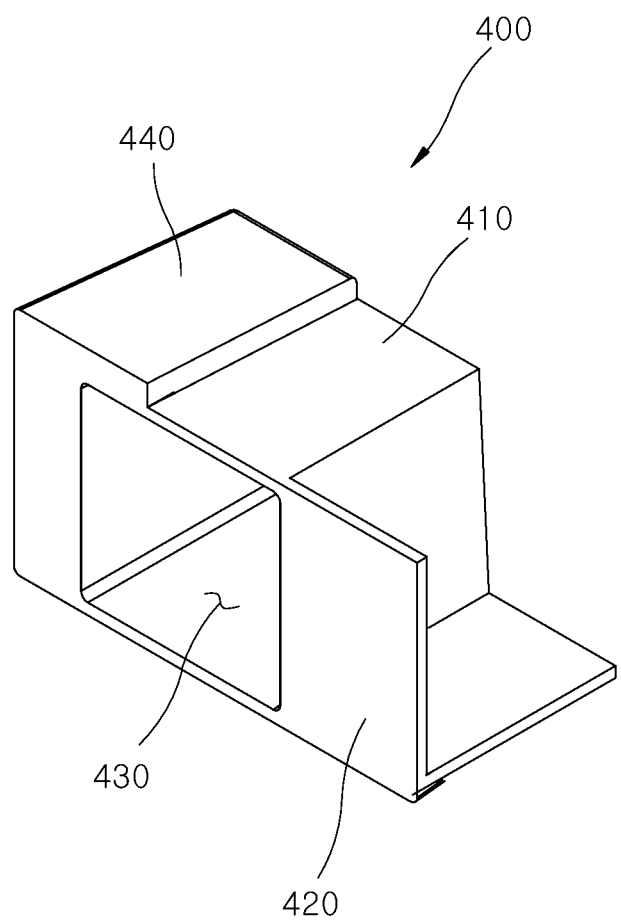
FIG. 5 is a perspective view schematically illustrating the structure of the first fastener in accordance with the embodiment of the present disclosure.

FIG. 5 is a perspective view schematically illustrating the structure of the first fastener in accordance with the embodiment of the present disclosure.

Referring to FIG. 5, the first fastener 400 in accordance with the embodiment of the present disclosure includes a first seating part 410, a second seating part 420, a first entry part 430 and a first movement prevention part 440.

The first seating part 410 is fastened to the first extension part 313 seated thereon. The first seating part 410 in accordance with the embodiment of the present disclosure may be formed in a hexahedral box shape. Among peripheral surfaces of the first seating part 410, top and rear surfaces (based on FIG. 5) form a substantially L-shaped cross-section corresponding to the shape of the inner surfaces of the first extension part 313. The top and rear surfaces of the first seating part 410 come into contact with the respective inner surfaces of the first extension part 313, facing each other. The first seating part 410 is fastened to the first extension part 313 by a screw passing through the first seating part 410 and the first extension part 313.

The second seating part 420 is disposed on one side of the first seating part 410, and one side of the first body 311 is seated on the second seating part 420 and fastened to the second seating part 420. The second seating part 420 in accordance with the embodiment of the present disclosure is horizontally extended from a right end (based on FIG. 5) of the first seating part 410. The second seating part 420 has a substantially L-shaped cross-section corresponding to the shape of the outer surfaces of the first body 311. The second seating part 420 is disposed so as to face an end portion of the first body 311 at which the first extension part 313 is disposed. The second seating part 420 has inner surfaces which come into contact with the front and bottom surfaces of the first body 311, respectively. The second seating part 420 is fastened to the first body 311 by a screw passing through the second seating part 420 and the first body 311.

The first entry part 430 is recessed into the first seating part 410 from the outside of the electric vehicle in the widthwise direction thereof. The first entry part 430 in accordance with the embodiment of the present disclosure may be formed in the shape of a groove which is concavely formed at the front surface of the first seating part 410 so as to be recessed toward the rear surface thereof. One side of the first entry part 430 communicates with the outside of the electric vehicle in the widthwise direction thereof through the front surface of the first seating part 410, and the other side of the first entry part 430 faces the rear surface of the first seating part 410. Thus, the first entry part 430 may provide a path through which a fastening tool can reach the rear surface of the first seating part 410 from the outside of the electric vehicle in the widthwise direction thereof. As the first fastener 400 has left and right drafts, the first entry part 430 may have a cross-section to form the shape of a closed curve.

The first movement prevention part 440 is disposed on the other side of the first seating part 410, and serves to prevent the side member 310 from moving in the longitudinal direction of the electric vehicle. The first movement prevention part 440 in accordance with the embodiment of the present disclosure may be formed in the shape of a stepped portion protruding in the height direction of the first seating part 410 from the left top surface (based on FIG. 5) of the first seating part 410. The first movement prevention part 440 has a right side surface brought into contact with the left side surface of the first extension part 313, and thus restricts the side member 310 from moving relative to the first fastener 400. Thus, the first movement prevention part 440 may prevent the side member 310 from moving in the longitudinal direction of the electric vehicle before the side member 310 is fastened to the first fastener 400, thereby reducing the possibility that the side member 310 and the first fastener 400 will be misassembled.

The second fastener 500 is extended from the second frame 200, and fastened to the other side of the side member 310. The second fastener 500 has one side connected to the second frame 200 through bolting or welding. The second fastener 500 has the other side extended toward the rear end of the side member 310. The second fastener 500 is provided so as to come into contact with the entire peripheries of the side member 310. For example, when the side member 310 has a rectangular cross-section, the second fastener 500 comes into contact with all four surfaces of the side member 310. Thus, the second fastener 500 may secure fastening points across the entire peripheries of the side member 310, which makes it possible to further reinforce the assembly stiffness.

The contact surfaces of the second fastener 500 with the side member 310 may be all accessible from the outside of the electric vehicle in the widthwise direction thereof. More specifically, among all the contact surfaces of the second fastener 500 with the side member 310, the contact surfaces which are not directly exposed to the outside as well as the contact surfaces which are directly exposed to the outside may be accessed from the outside of the electric vehicle in the widthwise direction thereof by a fastening tool Therefore, the second fastener 500 may enable a worker to perform a fastening work on all the contact surfaces at a single position, even though the worker does not change a work position depending on a fastening surface, which makes it possible to improve the efficiency and speed of the fastening work.

The second fastener 500 may be provided as a cast product manufactured through cast molding. The second fastener 500 has top and bottom drafts which are set on the basis of the electric vehicle in consideration of the structure of the vehicle body and the reduction of a consumed material. That is, when the second fastener 500 is formed, a mold is separated in a direction parallel to the height direction of the electric vehicle.

The second fastener 500 may be fastened to the side member 310 through the FDS process.

Figure 6:
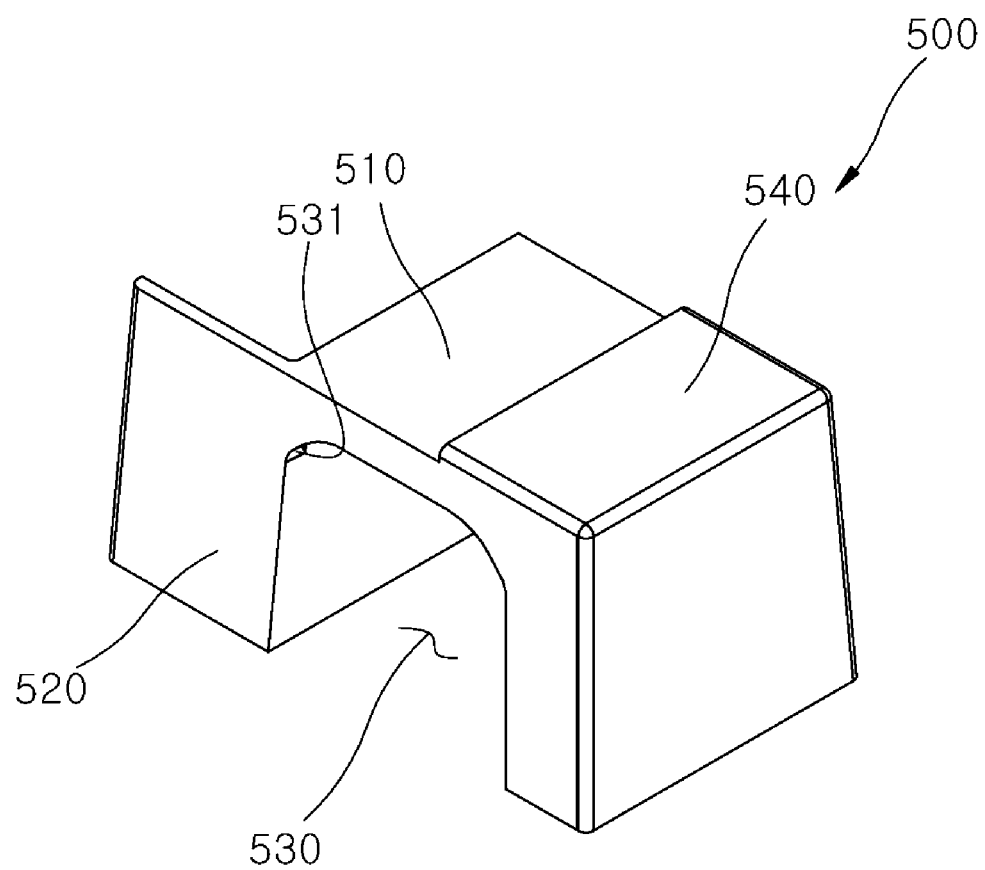
FIG. 6 is a perspective view schematically illustrating the structure of the second fastener in accordance with the embodiment of the present disclosure.

FIG. 6 is a perspective view schematically illustrating the structure of the second fastener in accordance with the embodiment of the present disclosure.

Referring to FIG. 6, the second fastener 500 in accordance with the embodiment of the present disclosure includes a third seating part 510, a fourth seating part 520, a second entry part 530 and a second movement prevention part 540.

The third seating part 510 is fastened to the second extension part 314 seated thereon. The third seating part 510 in accordance with the embodiment of the present disclosure may be formed in a hexahedral box shape. Among peripheral surfaces of the third seating part 510, top and rear surfaces (based on FIG. 6) form a substantially L-shaped cross-section corresponding to the shape of the inner surfaces of the second extension part 314. The top and rear surfaces of the third seating part 510 come into contact with the respective inner surfaces of the second extension part 314, facing each other. The third seating part 510 is fastened to the second extension part 314 by a screw passing through the third seating part 510 and the second extension part 314.

The fourth seating part 520 is disposed on one side of the third seating part 510, and the other side of the first body 311 is seated on the fourth seating part 520 and fastened to the fourth seating part 520. The fourth seating part 520 in accordance with the embodiment of the present disclosure is horizontally extended from the left end (based on FIG. 6) of the third seating part 510. The fourth seating part 520 is formed to have a substantially L-shaped cross-section corresponding to the shape of the outer surfaces of the first body 311. The fourth seating part 520 is disposed so as to face the end of the first body 311, at which the second extension part 314 is disposed. The fourth seating part 520 has inner surfaces which come into contact with the front and bottom surfaces of the first body 311, respectively. The fourth seating part 520 is fastened to the first body 311 by a screw passing through the fourth seating part 520 and the first body 311.

The second entry part 530 is recessed into the third seating part 510 from the outside of the electric vehicle in the widthwise direction thereof. The second entry part 530 in accordance with the embodiment of the present disclosure may be formed in the shape of a groove which is concavely formed at the front surface of the third seating part 510 so as to be recessed toward the rear surface thereof. One side of the second entry part 530 communicates with the outside of the electric vehicle in the widthwise direction thereof through the front surface of the third seating part 510, and the other side of the second entry part 530 faces the rear surface of the third seating part 510. Thus, the second entry part 530 may provide a path through which a fastening tool can reach the rear surface of the third seating part 510 from the outside of the electric vehicle in the widthwise direction thereof.

As the second fastener 500 has top and bottom drafts, the second entry part 530 may have a cross-section formed in the shape of a curve whose one side is open. More specifically, as the mold is separated in the top-to-bottom direction based on the electric vehicle when the second fastener 500 is formed, the second entry part 530 has a U-shaped cross-section whose top is open. Thus, the second fastener 500 may have lower load support performance than the first fastener 400 in which the first entry part 430 having a closed curve shape is formed. In order to reinforcement the load support performance of the second fastener 500, the second entry part 530 may have a load dispersion part 531 to disperse a load applied to the second fastener 500. The load dispersion part 531 in accordance with the embodiment of the present disclosure is disposed on the cross-sectional periphery of the second entry part 530, and curved at a predetermined curvature so as to have a smoothly curved shape. Thus, the load dispersion part 531 may prevent stress concentration at the boundary between the second entry part 530 and the third seating part 510, thereby reinforcing the load support performance of the second fastener 500. The shape of the load dispersion part 531 is not limited to the round shape, but may be designed in various shapes as long as the load dispersion part 531 can disperse a load applied to the second fastener 500.

The second movement prevention part 540 is disposed on the other side of the third seating part 510, and serves to prevent the side member 310 from moving in the longitudinal direction of the electric vehicle. The second movement prevention part 540 in accordance with the embodiment of the present disclosure may be formed in the shape of a stepped portion protruding in the height direction of the third seating part 510 from the right top surface (based on FIG. 6) of the third seating part 510. The left side surface of the second movement prevention part 540 comes into contact with the right side surface of the second extension part 314, thereby restricting the side member 310 from moving relative to the second fastener 500. Thus, the second movement prevention part 540 may prevent the side member 310 from moving in the longitudinal direction of the electric vehicle before the side member 310 is fastened to the second fastener 500, thereby reducing the possibility that the side member 310 and the second fastener 500 will be misassembled.

Hereafter, an assembly process of the chassis frame 1 for an electric vehicle in accordance with the embodiment of the present disclosure will be described in detail.

Figure 7:
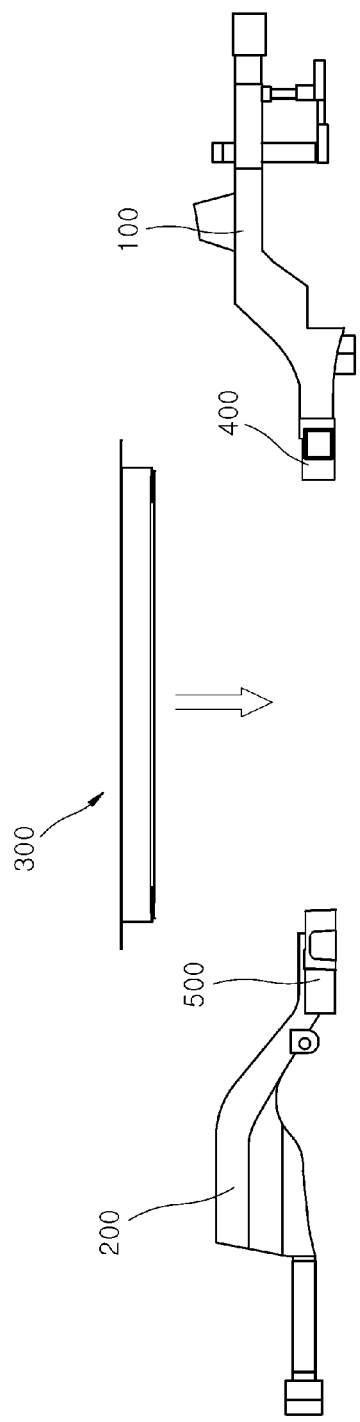
FIGS. 7 and 8 are diagrams schematically illustrating an assembly process of the chassis frame for an electric vehicle in accordance with the embodiment of the present disclosure.
Figure 8:
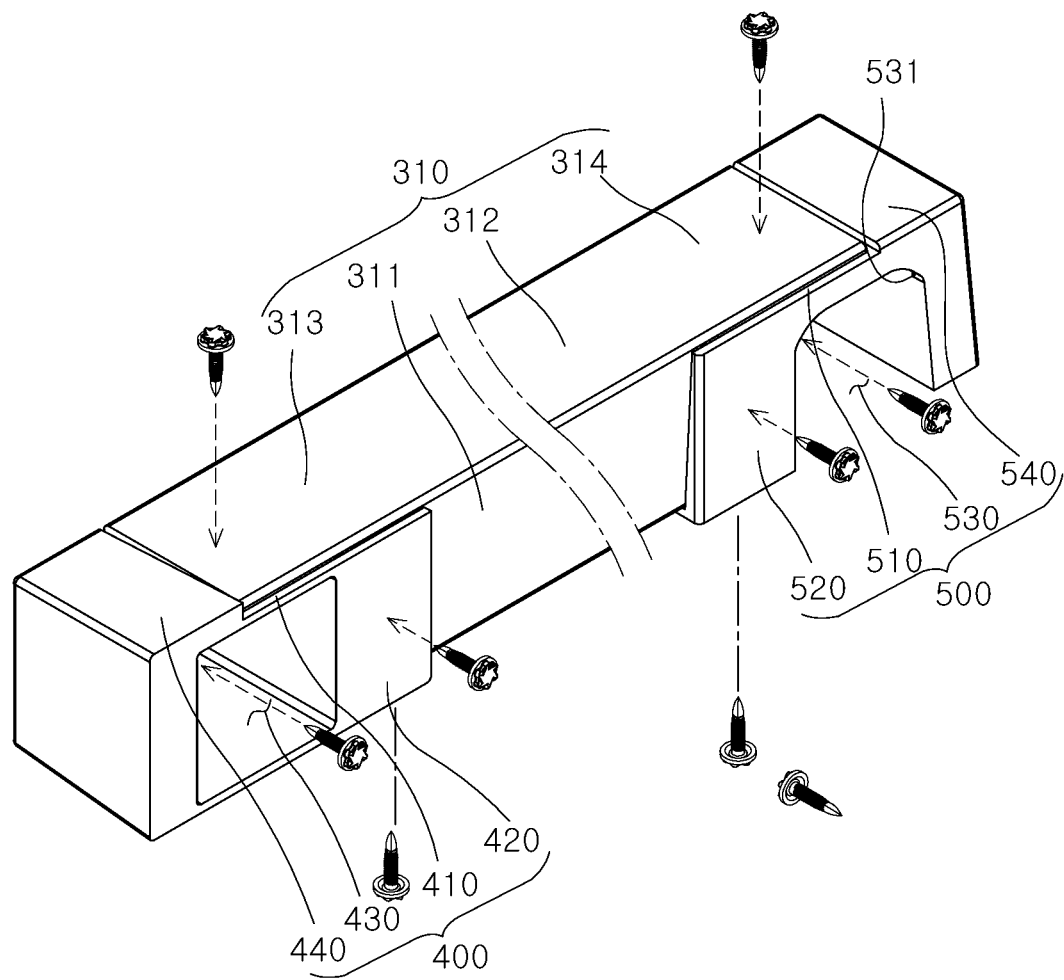

FIGS. 7 and 8 are diagrams schematically illustrating an assembly process of the chassis frame for an electric vehicle in accordance with the embodiment of the present disclosure.

Referring to FIGS. 7 and 8, the center frame 300 separated from the first and second frames 100 and 200 is loaded between the first and second frames 100 and 200 from the tops of the first and second frames 100 and 200 by an elevating device such as a lift.

As the center frame 300 is loaded between the first and second frames 100 and 200, the front end of the side member 310 is seated on the first fastener 400, and the rear end of the side member 310 is seated on the second fastener 500.

In this case, the first and second fasteners 400 and 500 come into contact with the entire peripheries of the side member 310.

More specifically, the inner surfaces of the first extension part 313, which form the top and rear surfaces of the left end (based on FIG. 8) of the side member 310, are brought into contact with the top and rear surfaces of the first seating part 410 and supported by the top and rear surfaces of the first seating part 410, and the left end of the first body 311, which forms the front and bottom surfaces of the left end of the side member 310, is brought into contact with the inner surfaces of the second seating part 420 and supported by the inner surfaces of the second seating part 420.

Furthermore, the inner surfaces of the second extension part 314, which form the top and rear surfaces of the right end (based on FIG. 8) of the side member 310, are brought into contact with the top and rear surfaces of the third seating part 510 and supported by the top and rear surfaces of the third seating part 510, and the right end of the first body 311, which forms the front and bottom surfaces of the right end of the side member 310, is brought into contact with the inner surfaces of the fourth seating part 520 and supported by the inner surfaces of the fourth seating part 520.

Then, a fastening tool with a screw for the FDS fastening process is introduced toward the contact surfaces between the side member 310 and the first and second fasteners 400 and 500, and fastens the side member 310 to the first and second fasteners 400 and 500.

In this case, the work of fastening the side member 310 to the first and second fasteners 400 and 500 may be performed outside the electric vehicle in the widthwise direction thereof.

More specifically, a worker first fastens the top, front and bottom surfaces of the side member 310, exposed to the outside of the electric vehicle in the widthwise direction thereof, to the contact surfaces of the first and second fasteners 400 and 500 by using the fastening tool. At this time, the worker directly performs the fastening work outside the electric vehicle through the FDS process.

Then, the worker introduces the fastening tool into the first and second entry parts 430 and 530 from the outside of the electric vehicle, and fastens the rear surface of the side member 310, which is not exposed to the outside of the electric vehicle in the widthwise direction thereof, to the contact surfaces of the first and second fasteners 400 and 500 through the FDS process.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A chassis frame for an electric vehicle, comprising:
a first frame and a second frame spaced apart from each other in a longitudinal direction of the electric vehicle;
a center frame disposed between the first frame and the second frame, and configured to have side members spaced apart from each other in a widthwise direction of the electric vehicle;
a first fastener, which extends from the first frame, and is fastened to a first side of a side member of the side members; and
a second fastener, which extends from the second frame, and is fastened to a second side of the side member,
wherein the first fastener and the second fastener are configured to be in contact with entire peripheries of the side member, and
wherein the side member comprises
a first body extending in the longitudinal direction of the electric vehicle, and being configured to form a first periphery of the side member;
a second body extending in the longitudinal direction of the electric vehicle, and being configured to form a second periphery of the side member;
a first extension part protruding in the longitudinal direction of the electric vehicle from a first end of the second body; and
a second extension part protruding in the longitudinal direction of the electric vehicle from a second end of the second body.

2. The chassis frame of claim 1, wherein a contact surface of the first fastener and a contact surface of the second fastener with respect to the side member are configured to be accessible from an exterior of the electric vehicle.

3. The chassis frame of claim 1, wherein the first body is disposed outside the electric vehicle in the widthwise direction of the electric vehicle, and the second body is disposed inside the electric vehicle in the widthwise direction of the electric vehicle.

4. The chassis frame of claim 3, wherein the first fastener comprises:
a first seating part fastened to the first extension part which is seated thereon;
a second seating part disposed on a first side of the first seating part, and fastened to a first side of the first body which is seated thereon; and
a first entry part which is recessed into the first seating part from the outside of the electric vehicle in the widthwise direction of the electric vehicle.

5. The chassis frame of claim 4, wherein the first fastener further comprises a first movement prevention part disposed on a second side of the first seating part, and configured to prevent the side member from moving in the longitudinal direction of the electric vehicle.

6. The chassis frame of claim 3, wherein the second fastener comprises:
   a third seating part fastened to the second extension part which is seated thereon;
   a fourth seating part disposed on a first side of the third seating part, and fastened to a second side of the first body which is seated thereon; and
   a second entry part recessed into the third seating part from the outside of the electric vehicle in the widthwise direction of the electric vehicle.

7. The chassis frame of claim 6, wherein the second fastener further comprises a second movement prevention part disposed on a second side of the third seating part, and configured to prevent the side member from moving in the longitudinal direction of the electric vehicle.

8. The chassis frame of claim 6, wherein the second entry part is configured to have a cross-section formed in a shape of a curve, one side of the second entry part is open, and the second entry part comprises a load dispersion part configured to disperse a load applied to the second fastener.

9. The chassis frame of claim 8, wherein the load dispersion part is disposed on a cross-sectional periphery of the second entry part, and is configured to be curved at a predetermined curvature.

10. The chassis frame of claim 1, wherein the first fastener and the second fastener are configured to be fastened to the side member through a Flow Drill Screw (FDS) process.

* * * * *